Feb. 14, 1928.

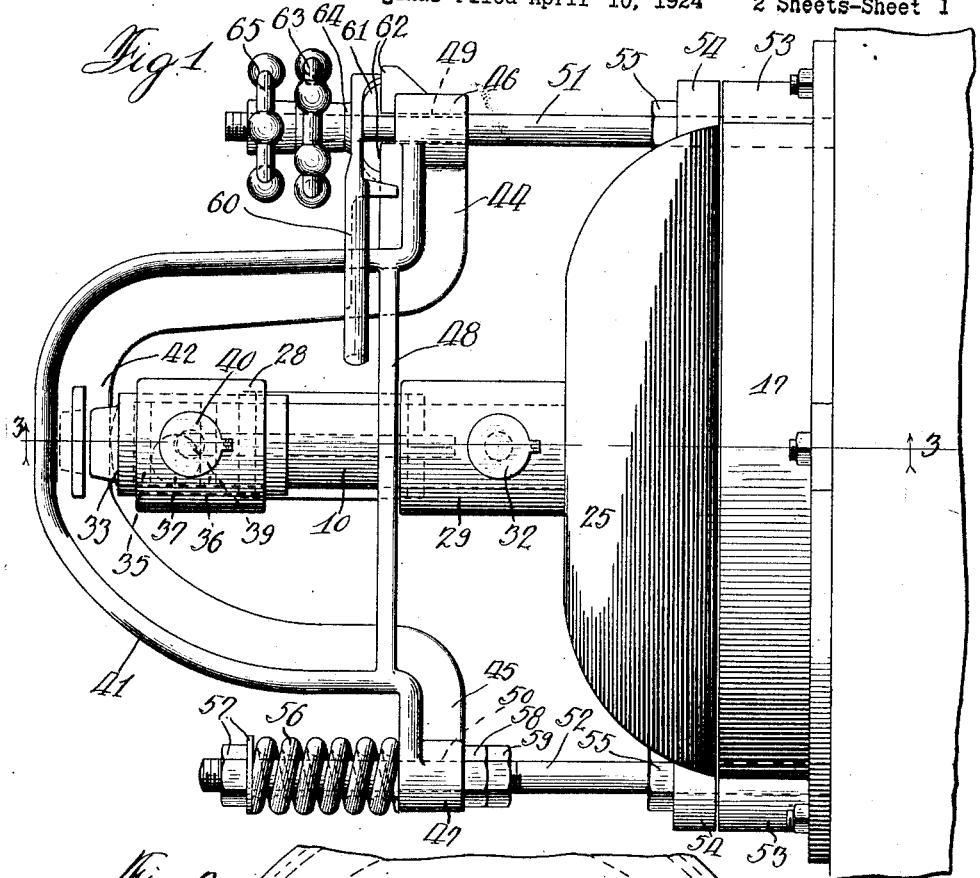
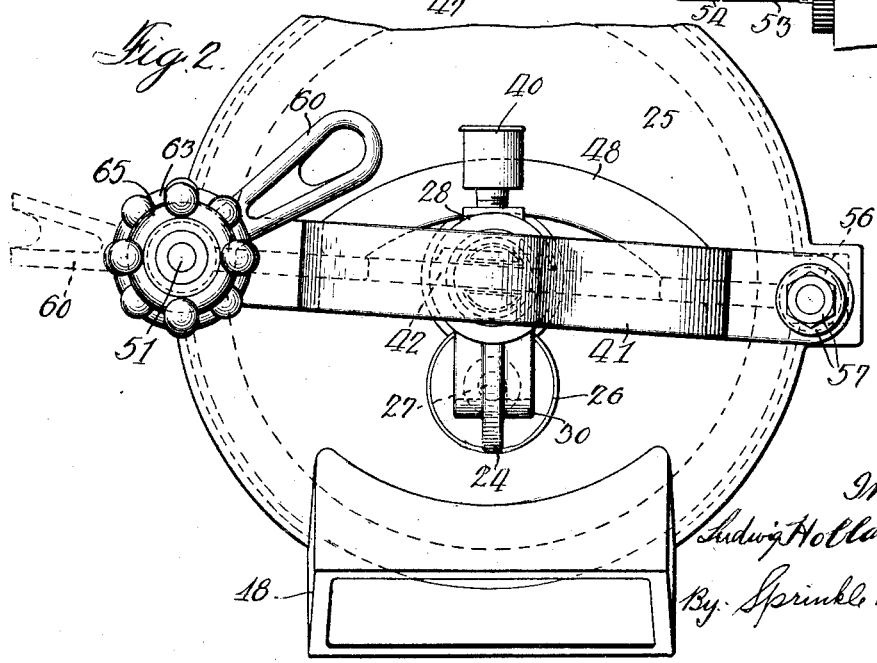

L. HOLLAND-LETZ 1,659,265

END THRUST BEARING

Original Filed April 10, 1924    2 Sheets-Sheet 2

Inventor
Ludwig Holland-Letz
By Sprinkle & Smith
Attys.

Patented Feb. 14, 1928.

1,659,265

UNITED STATES PATENT OFFICE.

LUDWIG HOLLAND-LETZ, OF CROWN POINT, INDIANA, ASSIGNOR TO THE LETZ MANUFACTURING COMPANY, A CORPORATION OF INDIANA.

END-THRUST BEARING.

Application filed April 10, 1924, Serial No. 705,417. Renewed November 23, 1927.

This invention relates to an end thrust bearing.

One of the objects of the present invention is to provide an improved and simplified form of an end thrust bearing.

A further object of the invention is to provide novel forms of ball bearing wearing plates which are adapted to move with respect to the shaft in such a manner that the bearing ball wears on a wide area of the bearing plates.

A still further object of the invention is to provide a novel form of support for the end thrust bearing.

A still further object of the invention is to provide an improved form of an end thrust bearing in such a manner that the wearing parts thereof are arranged so that the wearing surfaces over which the bearing balls travel are increased to a maximum and thereby extending the life of the same and eliminating the necessity of substituting repair parts unnecessarily.

These and other objects are accomplished by providing a construction and arrangement of the various parts in the manner hereinafter described and particularly pointed out in the appended claims.

Referring to the drawings, Fig. 1 is a top plan view of my improved form of end thrust bearing showing the same embodied in a feed mill.

Fig. 2 is a side elevational view of the construction shown in Fig. 1.

Figure 3:
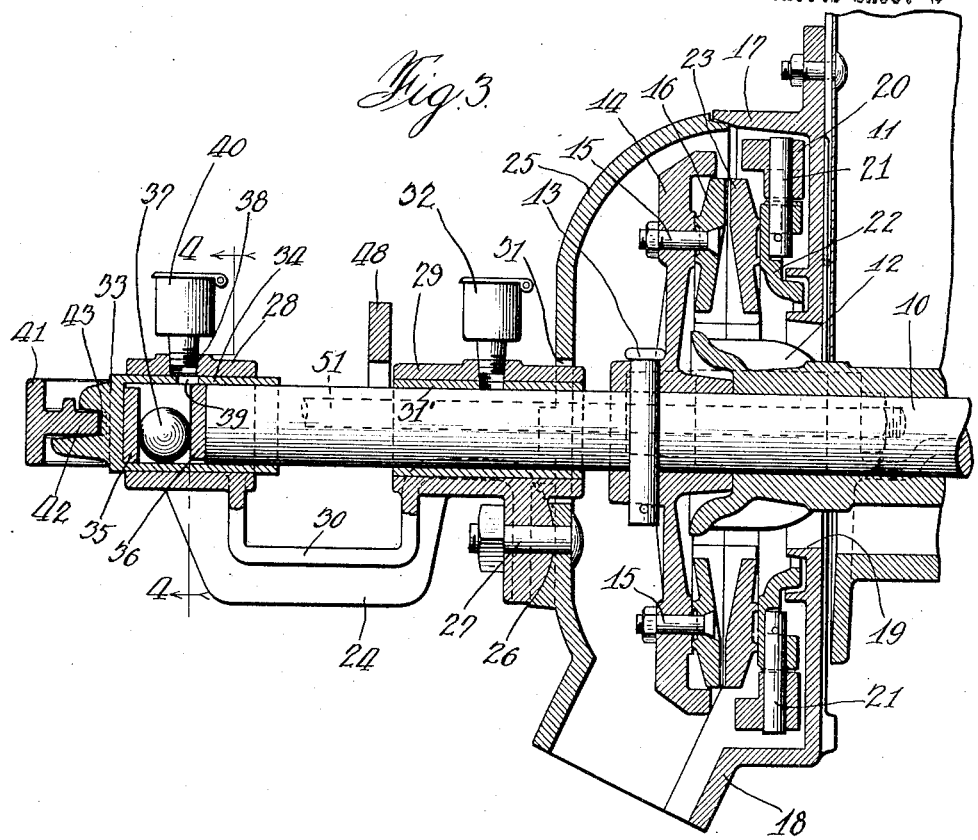
Fig. 3 is a cross sectional view taken on the lines 3—3 in Fig. 1.
Figure 4:
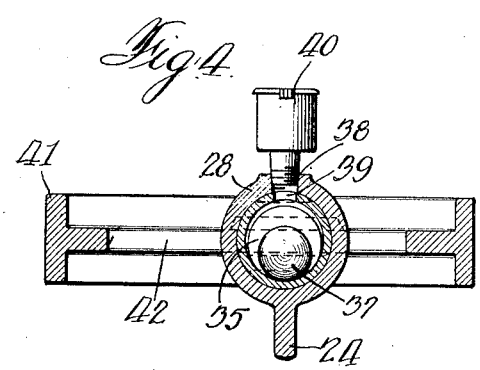
Fig. 4 is a cross sectional view taken on the lines 4—4 in Fig. 3.

For the purpose of illustration I have shown my improved end thrust bearing in connection with a feed grinder or mill, but it will be readily understood that the same is adapted for use in connection with various other types of machines.

In carrying out my invention I have shown the same in connection with a feed mill which comprises a driven shaft 10 having secured thereto adjacent the hopper 11 of the feed mill a spiral feed member 12. Secured to the shaft 10 adjacent the spiral member 12 by means of a pin 13 is the usual rotating buhr holder 14. Secured to the buhr holder 14 by means of bolts 15 is the usual rotating buhr 16. Secured to the frame of the feed mill in a manner well known is the stationary buhr casing 17, which is substantially cylindrical in form and provided with a downwardly extending chute 18 at the lower end therof. This casing 17 is provided with a central opening as shown at 19 through which the spiral feed member 12 and shaft 10 extend. Mounted in the stationary buhr casing 17 is a self-aligning plate holder which consists of a ring 20 which is swivelly mounted by means of outwardly projecting lugs seated in sockets formed in the casing (not shown). Pivotally mounted by means of vertical pins 21 is a stationary buhr holder plate 22. Secured to the buhr holder plate 22 by means of bolts is a relatively stationary buhr 23. By this construction it will be understood that the stationary buhr is permitted to rock upon horizontal and vertical axes in properly aligning itself with the rotating buhr 16 carried by the rotating buhr holder 14. The construction thus far described per se does not form any part of the present invention and for this reason it is thought a more detailed description of the same is unnecessary.

One of the improved features of my invention is the provision of a novel form of bracket 24, which is adjustably secured to the buhr casing 25 by means of a ball and socket connection as shown at 26 by a bolt 27. The buhr casing 25 is positioned and arranged to mesh with the stationary buhr casing 17 to completely encase the grinding buhrs of the mill. The bracket 24 is provided with two spaced apart bearing portion 28 and 29 which are connected together by means of a depressed connecting portion 30, as clearly shown in Fig. 3. The bearing portion 29 of the bracket 24 is arranged to extend through an aperture 31 in the casing 25. The aperture 31 is relatively larger than the diameter of the bearing portion 29 so as to permit the adjustment of the bracket on its ball and socket connection with the casing 25 in properly aligning the bearing portions 28 and 29 with the shaft 10. The bearing portion 29 is provided with the usual soft metal bearing bushing 31 and grease cup 32. Mounted in the bearing portion 28 of the bracket 24 is an end thrust member 33 which has formed integrally therewith a sleeve portion 34 which forms a bushing for the outer end of the shaft 10. Positioned between the end of the shaft and the end thrust member 33 is my improved thrust bearing which comprises two bearing members 35 and 36 and a bearing ball 37. These members 35 and 36 are in the form of discs which are of relatively smaller diameter than the diameter of the shaft and by reason of their diameter are permitted to float or move laterally with respect to the shaft when the shaft is operatively driven. Positioned between the discs or bearing members 35 and 36 is a bearing ball of relatively smaller diameter than the diameter of the shaft, but at the same time is of a diameter that is relatively larger than one half the diameter of the shaft. By this construction it will readily be seen that as the shaft 10 is driven at a relatively high rate of speed by reason of the lateral or floating movement of the bearing members or discs 35 and 36 and by reason of the free and lateral movement of the bearing ball 37, the bearing ball is permitted to wear on the bearing members 35 and 36 over a wide area or surface of these bearing members and thereby permitting the bearing ball 37 to wear a wide race-way in each of these bearing members. This construction and arrangment will lengthen the life of these bearing members or discs and will eliminate the necessity of constantly repairing these parts. These bearing discs 35 and 36 are of relatively very hard material ground perfectly true with parallel sides so as to permit them to creep freely as the shaft rotates. The discs are reversible so that when one of their sides become worn the other side may be used.

While I have shown the end thrust member 33 having a sleeve portion 34 formed integrally therewith, it will, of course, be understood that these parts may be easily made of separate members and will function equally as well. The bearing portion 28 of the bracket 24 is provided with a threaded aperture 38 on the top side thereof, which registers with an aperture 39 in the sleeve portion 34 of the end thrust member 33 for supplying a lubricant to the end thrust bearing by a cup 40 secured in the threaded aperture 38 of the bearing portion 28. The end thrust member 33 is retained in the bearing portion 28 of the bracket 24 by means of a yoke or U-shaped member 41 which has a horizontally extending rib 42 seated in a recess 43 formed in the outer end of the end thrust member 33, as clearly shown in Figs. 1 and 3. The U-shaped member 41 is provided with outwardly extending arms 44 and 45, which, in turn are provided with bosses 46 and 47, respectively. The arms 44 and 45 are reinforced or strengthened by a curved cross bar 48, which is formed integrally with the U-shaped member 41. The bosses 46 and 47 are provided with longitudinally extending bores 49 and 50, which are adapted to receive studs 51 and 52, respectively. These studs 51 and 52 have their inner ends secured to the frame of the machine and extend through bosses 53 and 54 formed integrally with the stationary buhr casing 17 and buhr casing 25, respectively. Nuts 55 are provided for securely supporting the buhr casing 25 to the frame of the machine. The arm 45 of the U-shaped member 41 is yieldingly supported against an outward thrust by a compression spring 56, which is mounted on the outer end of the stud 52 and engages the outer side of the boss 47 of the arm 45 and secured in its adjusted position by a nut and washer 57. The arm 45 of the U-shaped member 41 is limited in its inward movement by adjustable nut 58 and lock nut 59.

If by accident any foreign material such as a piece of steel, a nut or a bolt should become lodged between the rotating grinding buhrs and it becomes necessary to separate the buhrs in order to remove such foreign material, I have provided an arrangement whereby the end thrust member may be readily moved outwardly in a direction longitudinally of the axis of the shaft 10 by providing a hand operating crank 60 having cam portions 61 formed integrally therewith, which are adapted to engage corresponding cam portions 62 formed on the outer side of the stud 46 of the arm 44. The hand operating crank is pivotally mounted on the stud 51 and is adjusted to various positions of adjustment by a hand screw 63 which is in threaded engagement with the stud 51 and engages the hub 64 of the crank 60. The hand screw 63 is locked in various positions of adjustment by a spiral hand screw 65 which is also in threaded engagement with the stud 51.

From the above description it will be noted that as the hand operating lever 60 is swung in a direction to relieve the cam operating surfaces 61 and 62 of the hand operating lever 60 and boss 46, respectively, the arm 44 of the U-shaped member will swing outwardly with respect to the mill a distance equal to the depth of these cams and the arm 45 of the U-shaped member 41 will rest against the nut 58 and thereby permit the end thrust member to move outwardly with respect to the shaft, which, in turn, will permit the shaft to move outwardly in a direction toward the end thrust member 33 and thereby separate the rotating buhr 16 from the relatively stationary buhr 23 and permit any foreign matter to drop from between these buhrs.

In providing an end thrust bearing where a single bearing ball travels eccentrically with respect to the longitudinal axis of the shaft and where the shaft rotates at a relatively high rate of speed, it will be noted that there is a tendency to vibrate the shaft and in order to overcome this vibration I have found it necessary to provide a construction of a bearing support for the shaft in the form of the bracket that I have shown and described in which two bearing portions are spaced apart and at the same time secured together as an integral member. By this arrangement the vibration of the shaft is reduced to a minimum because the inner bearing portion opposes the vibration caused by the outer end of the shaft and thereby reduces this vibration to a minimum.

In the operation of my improved end thrust bearing, it will be noted that as the shaft rotates, the centrifugal force will cause the bearing ball to contact with the inner surface of the sleeve 34 and at the same time, the floating discs will creep laterally, or in other words, constantly change their positions with respect to the axis of the shaft and to the bearing ball, thereby permitting the ball to wear a path having a width equivalent to the difference in diameters of the bore sleeve and discs.

From the above description it will also be seen that by providing bearing members or discs which are adapted to float or move laterally with respect to the shaft and positioning a bearing ball, which is also adapted to float or move laterally with respect to the shaft, I have porvided a construction in which the wearing parts or surfaces have been increased to a maximum and thereby lengthening the life of these parts and reducing the necessity of frequently replacing these parts by new ones.

While I have illustrated, shown and described bearing members or discs and a bearing ball of relatively smaller diameter of the shaft, it will, of course, be understood that a construction can be provided in which the diameter of these bearing plates and bearing ball may be of relatively larger diameter than the shaft by enlarging that portion of the bearing in which these parts operate and still accomplish the same result that I have accomplished by the construction I have illustrated.

It is therefore within the contemplation of my invention to cover this form and other modifications which may be readily apparent.

What I claim as my invention and desire to secure by Letters Patent is:

1. A thrust bearing for a shaft comprising a bearing in which said shaft is mounted, an end thrust member, a bearing ball, and laterally movable bearing members positioned between said ball and the end of said shaft and between said ball and the end thrust member.

2. A thrust bearing for a shaft comprising a frame, a bracket adjustably secured to said frame, said bracket having spaced apart bearing portions for supporting said shaft, an end thrust member adjustably mounted in one of said bearing portions, and laterally movable bearing members and a bearing ball carried by said last named bearing portion and positioned between said end thrust member and one end of said shaft.

3. A thrust bearing for a shaft comprising a frame, a bracket adjustably secured to said frame, said bracket having spaced apart bearing portions for supporting said shaft, an end thrust member adjustably mounted in one of said bearing portions, and laterally movable bearing members and a bearing ball of relatively smaller diameter than said shaft carried by said last named bearing portion and positioned between said end thrust member and one end of said shaft.

4. A thrust bearing for a shaft comprising a frame, a bracket adjustably secured to said frame, said bracket having spaced apart bearing portions for supporting said shaft, an end thrust member carried by one of said bearing portions, a bearing disc of relatively smaller diameter than said shaft and contacting with one end of said shaft, a second bearing disc of relatively smaller diameter than said shaft and contacting with said end thrust member, and a bearing ball of relatively smaller diameter than said shaft and positioned between said bearing discs.

5. A thrust bearing for a shaft comprising a bearing in which said shaft is mounted, an end thrust member, and a laterally movable bearing member and ball positioned between the end of said shaft and said end thrust member whereby said ball wears over a wide area on said laterally movable bearing member.

6. A thrust bearing for a shaft comprising a bearing in which said shaft is mounted, an end thrust member, a bearing plate mounted between the end of said shaft and end thrust member, a bearing ball mounted between said bearing and said end thrust member, said ball and said plate being laterally movable relative to each other whereby said ball travels over a constantly changing path on said plate.

7. A thrust bearing for a shaft comprising a bearing in which said shaft is mounted, an end thrust member, a bearing plate mounted between said shaft and said end thrust member and a bearing ball mounted between said bearing plate and the end of said shaft, said bearing ball and said plate being laterally movable relative to each other whereby said ball travels over a relatively wide path on said plate.

8. A thrust bearing for a shaft comprising a bearing in which said shaft is mounted, and an end thrust member, a bearing plate contacted with the end of said shaft, a second bearing plate contacted with said end thrust member, and a bearing ball positioned between said bearing plates, said bearing ball and said plates being laterally movable relative to each other whereby said ball travels over a constantly changing path on said plate.

In testimony whereof I have signed my name to this specification, on this 31st day of March A. D. 1924.

LUDWIG HOLLAND-LETZ.